(12) United States Patent
Amada et al.

(10) Patent No.: US 9,790,578 B2
(45) Date of Patent: Oct. 17, 2017

(54) STEEL FOR TRACKED UNDERCARRIAGE COMPONENT, AND TRACK LINK

(71) Applicant: KOMATSU LTD., Tokyo (JP)

(72) Inventors: Eiji Amada, Kyotanabe (JP); Kazuo Maeda, Takatsuki (JP); Takeji Kajiura, Isehara (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/764,626

(22) PCT Filed: May 8, 2014

(86) PCT No.: PCT/JP2014/062376

§ 371 (c)(1),
(2) Date: Jul. 30, 2015

(87) PCT Pub. No.: WO2014/185337

PCT Pub. Date: Nov. 20, 2014

(65) Prior Publication Data

US 2015/0361534 A1 Dec. 17, 2015

(30) Foreign Application Priority Data

May 17, 2013 (JP) .................................. 2013-104939

(51) Int. Cl.
*B62D 55/18* (2006.01)
*C22C 38/44* (2006.01)
(Continued)

(52) U.S. Cl.
CPC .............. *C22C 38/44* (2013.01); *B62D 55/08* (2013.01); *B62D 55/20* (2013.01); *B62D 55/21* (2013.01);
(Continued)

(58) Field of Classification Search
CPC ......... C22C 38/54; C22C 38/48; C22C 38/46; C22C 38/52; C22C 38/50; C22C 38/06;
(Continued)

(56) References Cited

U.S. PATENT DOCUMENTS 4,171,233 A * 10/1979 Vander Voort .......... C22C 38/40
148/330
5,500,058 A * 3/1996 Hirakawa .............. B21K 23/02
148/649

(Continued)

FOREIGN PATENT DOCUMENTS

CN 101855372 A 10/2010
CN 102304673 A 1/2012
(Continued)

OTHER PUBLICATIONS

Aug. 5, 2014 International Search Report issued in International Application No. PCT/JP2014/062376.
(Continued)

*Primary Examiner* — Kip T Kotter
*Assistant Examiner* — Scott A Browne
(74) *Attorney, Agent, or Firm* — Oliff PLC

(57) ABSTRACT

A steel for a tracked undercarriage component is used as a material constituting a track link (9), for example, and contains: not less than 0.39% by mass and not more than 0.45% by mass of carbon, not less than 0.2% by mass and not more than 1.0% by mass of silicon, not less than 0.10% by mass and not more than 0.90% by mass of manganese, not less than 0.002% by mass and not more than 0.005% by mass of sulfur, not less than 0.1% by mass and not more than 3.0% by mass of nickel, not less than 0.70% by mass and not more than 1.50% by mass of chromium, and not less than
(Continued)

0.10% by mass and not more than 0.60% by mass of molybdenum, with the balance made of iron and unavoidable impurities.

12 Claims, 12 Drawing Sheets

(51) Int. Cl.

| | | |
|---|---|---|
| *B62D 55/26* | (2006.01) | |
| *B62D 55/08* | (2006.01) | |
| *B62D 55/20* | (2006.01) | |
| *B62D 55/21* | (2006.01) | |
| *C22C 38/02* | (2006.01) | |
| *C22C 38/04* | (2006.01) | |
| *C22C 38/08* | (2006.01) | |
| *C22C 38/12* | (2006.01) | |
| *C22C 38/06* | (2006.01) | |
| *C22C 38/46* | (2006.01) | |
| *C22C 38/50* | (2006.01) | |
| *C22C 38/52* | (2006.01) | |
| *C21D 1/18* | (2006.01) | |
| *C21D 9/00* | (2006.01) | |
| *C22C 38/54* | (2006.01) | |
| *C22C 38/48* | (2006.01) | |

(52) U.S. Cl.
CPC ............... *B62D 55/26* (2013.01); *C21D 1/18* (2013.01); *C21D 9/0087* (2013.01); *C22C 38/02* (2013.01); *C22C 38/04* (2013.01); *C22C 38/06* (2013.01); *C22C 38/08* (2013.01); *C22C 38/12* (2013.01); *C22C 38/46* (2013.01); *C22C 38/50* (2013.01); *C22C 38/52* (2013.01); *C21D 9/00* (2013.01); *C21D 2221/00* (2013.01); *C22C 38/48* (2013.01); *C22C 38/54* (2013.01)

(58) Field of Classification Search
CPC ......... C22C 38/04; C22C 38/02; C22C 38/12; C22C 38/08; C22C 38/44; C22C 38/00; C22C 38/22; C22C 38/40; C21D 9/0087; C21D 9/00; C21D 1/18; C21D 2221/00; B62D 55/21; B62D 55/20; B62D 55/08; B62D 55/26

See application file for complete search history.

(56) References Cited

U.S. PATENT DOCUMENTS

| | | | | |
|---|---|---|---|---|
| 5,759,309 | A * | 6/1998 | Watts | C21D 1/02 148/637 |
| 8,049,131 | B2 * | 11/2011 | Hara | B23K 9/0253 219/137 R |
| 2004/0047757 | A1 * | 3/2004 | Takayama | B32B 15/011 420/107 |
| 2006/0043791 | A1 * | 3/2006 | Sho | B62D 55/21 305/198 |
| 2008/0038143 | A1 * | 2/2008 | Witt | C22C 38/02 420/40 |
| 2010/0252150 | A1 | 10/2010 | Xue | |
| 2013/0180626 | A1 * | 7/2013 | Yoshida | C21D 1/32 148/219 |
| 2013/0273392 | A1 * | 10/2013 | Nonaka | C23C 2/06 428/659 |
| 2014/0152086 | A1 * | 6/2014 | Meyer | B62D 55/21 305/142 |
| 2016/0010166 | A1 * | 1/2016 | Yoshida | C21D 1/06 148/212 |

FOREIGN PATENT DOCUMENTS

| | | | |
|---|---|---|---|
| CN | WO 2013037116 A1 * | 3/2013 | ............ B62D 55/20 |
| CN | 103071751 A | 5/2013 | |
| DE | 4444426 A1 | 6/1996 | |
| DE | EP 2093304 A1 * | 8/2009 | ............ C21D 6/008 |
| JP | 2003-328078 A | 11/2003 | |
| JP | 2005-330554 A | 12/2005 | |
| JP | 2008-280618 A | 11/2008 | |
| JP | 2009-1910 A | 8/2009 | |
| JP | 2010-084227 A | 4/2010 | |

OTHER PUBLICATIONS

Cui Fengping et al., "Questions and Answers on Production of a Middle Plate," Beijing: Metallurgical Industry Press, Feb. 2010, pp. 140-141.

* cited by examiner

STEEL FOR TRACKED UNDERCARRIAGE COMPONENT, AND TRACK LINK

TECHNICAL FIELD

The present invention relates to a steel for a tracked undercarriage component and a track link, and more particularly to a steel for a tracked undercarriage component which is used as a material constituting a tracked undercarriage component and capable of improving durability of the tracked undercarriage component, and a track link made of that steel.

BACKGROUND ART

Undercarriage components for track-type work machines, such as hydraulic excavators and bulldozers, require high durability. Specifically, many of these undercarriage components come into contact with other components and move relatively thereto under the environment where sand and other hard objects intrude. It is thus necessary for the undercarriage components to have high wear resistance. To improve wear resistance, it is effective to increase the hardness of the components. Simply increasing the hardness of a component, however, will lead to reduction in toughness of the material constituting the component. The surface of the component may suffer cracking or peeling, giving rise to the need for replacement of the component. As such, in order to improve the durability of the undercarriage components of the track-type work machines, it is required to maintain high crack resistance and high peel resistance while achieving high wear resistance.

As a high-hardness and high-toughness steel capable of achieving both high hardness and high impact value, for example, a steel in which the addition amounts of alloy elements have been controlled in an attempt to achieve a Charpy impact value of at least 5 kgf·m as an index, while securing a hardness of HRC 50 or more, by tempering at a high temperature of 600° C. or higher has been proposed (see, for example, Japanese Patent Application Laid-Open No. 2003-328078 (Patent Literature 1)).

CITATION LIST

Patent Literature

Patent Literature 1: Japanese Patent Application Laid-Open No. 2003-328078

SUMMARY OF INVENTION

Technical Problem

Application of the steel disclosed in Patent Literature 1 above to the undercarriage components of track-type work machines, however, would not improve the durability sufficiently. More specifically, in the steel disclosed in Patent Literature 1, the element composition is controlled to improve toughness, using the Charpy impact value as an index. According to the investigations conducted by the present inventors, however, improved Charpy impact values of the undercarriage components of the track-type work machines do not necessarily lead to sufficiently improved peel resistance of the components. Therefore, even if the steel disclosed in Patent Literature 1 above is used, the durability of the tracked undercarriage components would not be improved sufficiently.

The present invention has been accomplished to solve the above-described problems, and an object of the present invention is to provide a steel for a racked undercarriage component capable of improving durability of the tracked undercarriage component, and a track link made of that steel.

Solution to Problem

A steel for a tracked undercarriage component according to the present invention is used as a material constituting a tracked undercarriage component. This steel for a tracked undercarriage component contains: not less than 0.39% by mass and not more than 0.45% by mass of carbon, not less than 0.2% by mass and not more than 1.0% by mass of silicon, not less than 0.10% by mass and not more than 0.90% by mass of manganese, not less than 0.002% by mass and not more than 0.005% by mass of sulfur, not less than 0.1% by mass and not more than 3.0% by mass of nickel, not less than 0.70% by mass and not more than 1.50% by mass of chromium, and not less than 0.10% by mass and not more than 0.60% by mass of molybdenum, with the balance consisting of iron and unavoidable impurities.

The present inventors conducted investigations regarding the way of achieving both high wear resistance and high peel resistance in a tracked undercarriage component (component constituting a track travel device). As a result, they found that controlling the element composition of the steel constituting a tracked undercarriage component by using the reduction of area in a tensile test as an index, rather than using the Charpy impact value as an index, would be effective for improving the peel resistance. On the basis of this knowledge, and in consideration of the wear resistance and peel resistance required for the tracked undercarriage components in recent years, the present inventors set a hardness of HRC 57 or more and a reduction of area of 40% or more as target values to be achieved by quenching and tempering in at least a region of the component where wear resistance is particularly required. The inventors then investigated the element composition of the steel that can achieve the above target values. As a result, it has become apparent that the target values can be achieved by the steel having the above-described element composition, which has led to the present invention. In other words, the hardness of HRC 57 or more and the reduction of area of 40% or more can be achieved by performing quenching and tempering on the steel having carbon, silicon, manganese, sulfur, nickel, chromium, and molybdenum controlled to the above-described composition. As explained above, according to the steel for a tracked undercarriage component of the present invention, it is possible to provide the steel for a tracked undercarriage component capable of improving the durability of the tracked undercarriage component.

The above-described steel for a tracked undercarriage component may further contain at least one species selected from the group consisting of not less than 0.05% by mass and not more than 0.20% by mass of vanadium, not less than 0.005% by mass and not more than 0.05% by mass of niobium, not less than 0.01% by mass and not more than 0.15% by mass of zirconium, not less than 0.01% by mass and not more than 0.10% by mass of titanium, and not less than 0.1% by mass and not more than 2.0% by mass of cobalt. When these elements are added additionally, the reduction of area can readily be improved and the durability of the tracked undercarriage component can further be improved.

The above-described steel for a tracked undercarriage component may further contain not less than 0.001% by mass and not more than 0.005% by mass of boron. Boron is an element which improves hardenability of the steel. By adding boron additionally, it is possible to impart sufficient hardenability to the steel, while restricting the contents of the elements that would decrease the reduction of area. Boron is coupled with nitrogen contained in the steel to form a nitride. Thus, in order to cause the added boron to function effectively, it is desirable that not less than 0.01% by mass and not more than 0.10% by mass of titanium is added together with boron.

In the above-described steel for a tracked undercarriage component, it is preferable that a value of Ra as a sum of a half of the carbon content, a quadruple of the sulfur content, and the content of phosphorus as an unavoidable impurity is 0.25% by mass or less. This can further improve the durability of the tracked undercarriage component.

In the above-described steel for a tracked undercarriage component, the value of Ra described above may be 0.22% by mass or more. This can reduce production cost, while imparting sufficient hardness to the tracked undercarriage component.

The above-described steel for a tracked undercarriage component may be used as a material constituting a track link. The above-described steel for a tracked undercarriage component is suitable as the material constituting the track link which requires both high wear resistance and high peel resistance. Particularly, in the tracked undercarriages in recent years, rotatable bushings are increasingly adopted, leading to longer lives of the bushings, which had conventionally determined the life of the undercarriage. As a result, there are an increasing number of cases where the lives of the track links determine the life of the undercarriage. When the steel for a tracked undercarriage component of the present invention is adopted as the material for the track links in the undercarriage where the rotatable bushings have been adopted, elongation of the life of the tracked undercarriage is expected.

The track link according to the present invention is made of a steel containing not less than 0.39% by mass and not more than 0.45% by mass of carbon, not less than 0.2% by mass and not more than 1.0% by mass of silicon, not less than 0.10% by mass and not more than 0.90% by mass of manganese, not less than 0.002% by mass and not more than 0.005% by mass of sulfur, not less than 0.1% by mass and not more than 3.0% by mass of nickel, not less than 0.70% by mass and not more than 1.50% by mass of chromium, and not less than 0.10% by mass and not more than 0.60% by mass of molybdenum, with the balance consisting of iron and unavoidable impurities. This track link includes: a base region; and a hardened region formed to include a rail surface and having a higher hardness as compared to the base region. The hardened region has a hardness of HRC 57 or more and a reduction of area of 40% or more.

In the above track link, the above-described steel may further contain at least one species selected from the group consisting of not less than 0.05% by mass and not more than 0.20% by mass of vanadium, not less than 0.005% by mass and not more than 0.05% by mass of niobium, not less than 0.01% by mass and not more than 0.15% by mass of zirconium, not less than 0.01% by mass and not more than 0.10% by mass of titanium, and not less than 0.1% by mass and not more than 2.0% by mass of cobalt.

Further, in the above track link, the above-described steel may further contain not less than 0.001% by mass and not more than 0.005% by mass of boron.

When the steel for a tracked undercarriage component of the present invention is adopted as the material constituting the track link, high wear resistance and high peel resistance can both be achieved. As a result, it is possible to provide the track link having excellent durability.

In the above track link, it is preferable that a value of Ra as a sum of a half of the carbon content, a quadruple of the sulfur content, and the content of phosphorus as an unavoidable impurity in the above-described steel is 0.25% by mass or less. This can further improve the durability of the track link.

In the above track link, the value of Ra described above may be 0.22% by mass or more. This can reduce production cost, while imparting sufficient hardness to the track link.

In the above track link, the base region may have a hardness of not less than HRC 30 and not more than HRC 45. This can improve the impact resistance of the base region.

A description will now be made about the reasons why the element composition of the steel has been limited to the above-described ranges.

Carbon: not less than 0.39% by mass and not more than 0.45% by mass

Carbon is an element which greatly affects the steel hardness. If the carbon content is less than 0.39% by mass, it will be difficult to obtain a hardness of HRC 57 or more by quenching and tempering. If the carbon content exceeds 0.45% by mass, however, it will be difficult to obtain a reduction of area of 40% or more. It is thus necessary for the carbon content to fall within the above-described range. Further, from the standpoint of readily securing a sufficient hardness, the carbon content is preferably 0.40% by mass or more. Still further, from the standpoint of readily securing a sufficient reduction of area, the carbon content is preferably 0.44% by mass or less.

Silicon: not less than 0.2% by mass and not more than 1.0% by mass

Silicon is an element which has the effects of improving the hardenability of the steel, enhancing the matrix of the steel, and improving the resistance to temper softening, and also has a deoxidizing effect in the steelmaking process. If the silicon content is 0.2% by mass or less, the above effects cannot be obtained sufficiently. If the silicon content exceeds 1.0% by mass, however, the reduction of area tends to decrease. It is thus necessary for the silicon content to fall within the above-described range. Silicon considerably improves the hardenability, so silicon added in an excessively large amount may lead to quenching crack. From the standpoint of readily avoiding such quenching crack, the silicon content is preferably 0.7% by mass or less.

Manganese: not less than 0.10% by mass and not more than 0.90% by mass

Manganese is an element effective in improving the hardenability of the steel, and also has a deoxidizing effect in the steelmaking process. If the manganese content is 0.10% by mass or less, the above effects cannot be obtained sufficiently. If the manganese content exceeds 0.90% by mass, however, the hardness before quench hardening will increase, leading to degradation in workability. It is thus necessary for the manganese content to fall within the above-described range. From the standpoint of securing sufficient hardenability of the steel, the manganese content is preferably 0.40% by mass or more. Further, focusing on the workability, the manganese content is preferably 0.85% by mass or less, and more preferably 0.80% by mass or less.

Sulfur: not less than 0.002% by mass and not more than 0.005% by mass

Sulfur is an element which improves machinability of the steel. Sulfur is also an element which is mixed during the steelmaking process even if not added intentionally. If the sulfur content is less than 0.002% by mass, the machinability will decrease, and the production cost of the steel will increase. According to the investigations of the present inventors, in the element composition of the steel for a tracked undercarriage component of the present invention, the sulfur content greatly affects the reduction of area. If the sulfur content exceeds 0.005% by mass, it will be difficult to obtain the reduction of area of 40% or more. It is thus necessary for the sulfur content to fall within the above-described range. The sulfur content of 0.004% by mass or less can further improve the peel resistance of the tracked undercarriage component.

Nickel: not less than 0.1% by mass and not more than 3.0% by mass

Nickel is an element effective in improving the toughness of the steel matrix. If the nickel content is less than 0.1% by mass, the above effect cannot be exerted. If the nickel content exceeds 3.0% by mass, however, it becomes more likely that nickel will segregate in the steel, which may lead to unevenness in mechanical properties of the steel. It is thus necessary for the nickel content to fall within the above-described range. Further, if the nickel content exceeds 2.0% by mass, the improvement in toughness will become moderate, and the production cost of the steel will increase. From these standpoints, the nickel content of 2.0% by mass or less is preferable. In order to sufficiently exert the effect of improving the toughness of the steel matrix in the steel having the hardness of HRC 57 or more, the nickel content of 1.0% by mass or more is preferable.

Chromium: not less than 0.70% by mass and not more than 1.50% by mass

Chromium improves hardenability of the steel and also enhances the resistance to temper softening. In particular, chromium being added in combination with molybdenum, niobium, vanadium, and the like can considerably enhance the resistance to temper softening of the steel. If the chromium content is less than 0.70% by mass, the above effects cannot be exerted sufficiently. If the chromium content exceeds 1.50% by mass, the improvement of the resistance to temper softening will become moderate, and the production cost of the steel will increase. It is thus necessary for the chromium content to fall within the above-described range.

Molybdenum: not less than 0.10% by mass and not more than 0.60% by mass

Molybdenum improves hardenability and enhances the resistance to temper softening. Molybdenum also has the function of improving the high temperature temper brittleness. If the molybdenum content is less than 0.10% by mass, the above effects cannot be exerted sufficiently. If the molybdenum content exceeds 0.60% by mass, however, the above effects will be saturated. It is thus necessary for the molybdenum content to fall within the above-described range.

Vanadium: not less than 0.05% by mass and not more than 0.20% by mass

Vanadium is not an indispensable element to the steel for a tracked undercarriage component of the present invention. Vanadium, however, forms fine carbide, contributing to production of finer crystal grains. If the vanadium content is less than 0.05% by mass, the above effect cannot be obtained sufficiently. If the vanadium content exceeds 0.20% by mass, however, the above effect will be saturated. Vanadium is relatively expensive, so it is preferable that vanadium is added in a minimum required amount. Therefore, in the case of adding vanadium, the addition amount falling within the above-described range is appropriate.

Niobium: not less than 0.005% by mass and not more than 0.05% by mass

Niobium is effective in improving the strength and toughness of the steel, and in producing finer crystal grains. Particularly, when niobium is added in combination with chromium and/or molybdenum, the crystal grains of the steel become extremely fine, and the resistance to temper softening is increased considerably, so niobium is very effective for improvement of toughness. In order to secure these effects, the niobium content should be 0.005% by mass or more. On the other hand, if the niobium content exceeds 0.05% by mass, coarse eutectic NbC will crystallize and also the carbon content in the matrix will decrease due to formation of NbC in a large amount, leading to degradation in strength and toughness of the steel. Further, if the niobium content exceeds 0.05% by mass, the production cost of the steel will increase. Thus, in the case of adding niobium, the addition amount falling within the above-described range is appropriate. Furthermore, the niobium content of 0.04% by mass or less is preferable from the standpoints of reducing the production cost and more reliably suppressing the problems of degradation in strength and toughness.

Zirconium: not less than 0.01% by mass and not more than 0.15% by mass

Zirconium is not an indispensable element, but it has the effect of further improving the toughness of the steel by making carbides in the form of fine spherical particles dispersed in the steel. Particularly, zirconium is preferably added in order to impart high toughness to high-strength steel. If the zirconium content is less than 0.01% by mass, the effects cannot be obtained sufficiently. If the zirconium content exceeds 0.15% by mass, however, the toughness of the steel would rather deteriorate. Thus, in the case of adding zirconium, the addition amount falling within the above-described range is appropriate.

Titanium: not less than 0.01% by mass and not more than 0.10% by mass

Titanium can be added, as required, for the purpose of improving the toughness of the steel. If the titanium content is less than 0.01% by mass, the effect of improving the toughness is small. If the titanium content exceeds 0.10% by mass, however, the toughness of the steel would rather deteriorate. Thus, in the case of adding titanium, the addition amount falling within the above-described range is appropriate.

Cobalt: not less than 0.1% by mass and not more than 2.0% by mass

Cobalt is not an indispensable element, but it increases the solid solubility of chromium, molybdenum, and other carbide-forming elements to the matrix, and also improves the resistance to temper softening of the steel. Thus, addition of cobalt leads to finer carbides and higher tempering temperature, which can improve the strength and toughness of the steel. If the cobalt content is less than 0.1% by mass, the above effects cannot be obtained sufficiently. On the other hand, cobalt decreases the hardenability of the steel. Further, because of its expensiveness, cobalt added in a large amount will increase the production cost of the steel. These problems become prominent if the cobalt content exceeds 2.0% by mass. Thus, in the case of adding cobalt, the addition amount falling within the above-described range is appropriate.

Boron: not less than 0.001% by mass and not more than 0.005% by mass

Boron is an element which considerably improves the hardenability of the steel. Addition of boron can decrease the addition amounts of the other elements added for the purpose of improving the hardenability, and can reduce the production cost of the steel. Boron has a strong tendency of segregating in the prior austenite grain boundary as compared to phosphorus and sulfur, and boron particularly expels sulfur from the grain boundary, thereby improving the grain boundary strength. If the boron content is 0.001% by mass or less, the above effects cannot be exerted sufficiently. If the boron content exceeds 0.005% by mass, however, the added boron and nitrogen will combine to form BN, thereby degrading the toughness of the steel. Thus, in the case of adding boron, the addition amount falling within the above-described range is appropriate.

Effects of the Invention

As apparent from the above description, according to the steel for a tracked undercarriage component of the present invention, it is possible to improve the durability of the tracked undercarriage component. Further, according to the track link of the present invention, it is possible to provide the track link excellent in durability.

DESCRIPTION OF EMBODIMENTS

Figure 1:
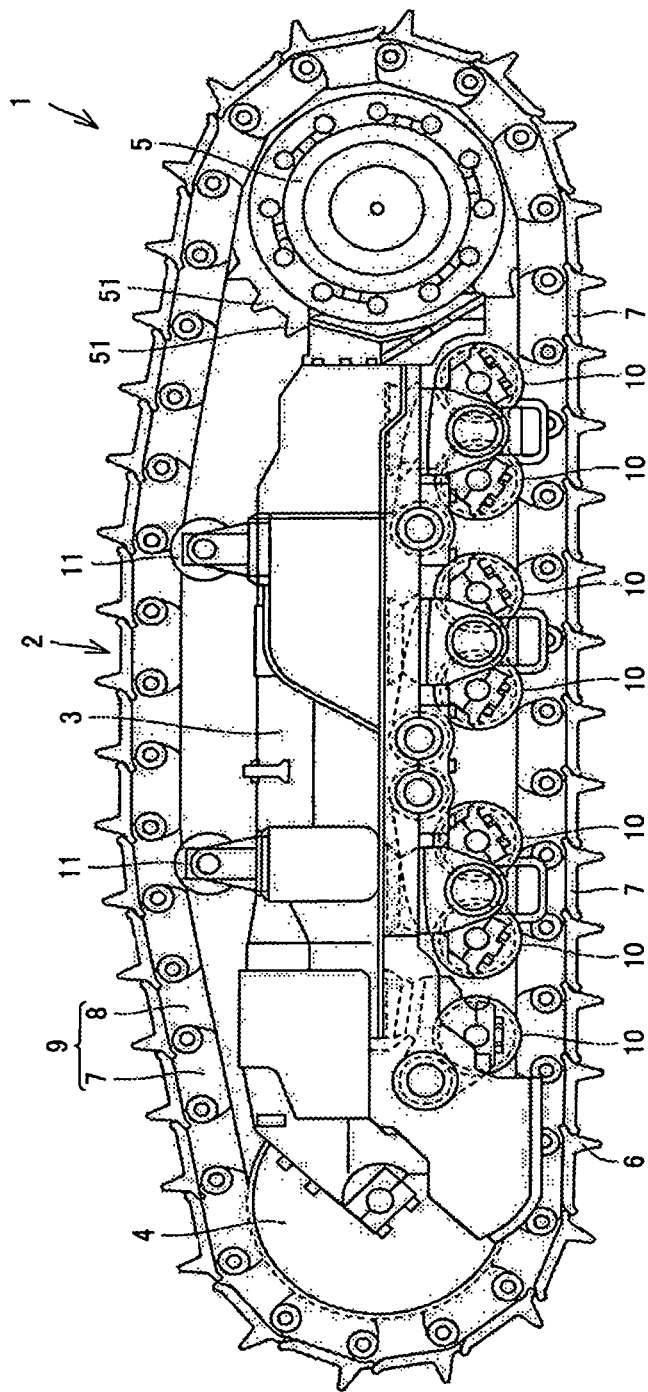
FIG. 1 is a schematic view showing the structure of a track travel device.

An embodiment of the present invention will now be described. In the following drawings, the same or corresponding parts are denoted by the same reference numerals, and the description thereof will not be repeated.

A steel for a tracked undercarriage component of the present invention can be used, for example, as a material constituting track links included in a track travel device, as described below. Referring to FIG. 1, the track travel device 1 according to the present embodiment is a travel device for a work machine such as a bulldozer, and includes: a track 2; a track frame 3; an idler tumbler 4; a sprocket wheel 5; a plurality of (here, seven) track rollers 10; and a plurality of (here, two) carrier rollers 11.

Figure 2:
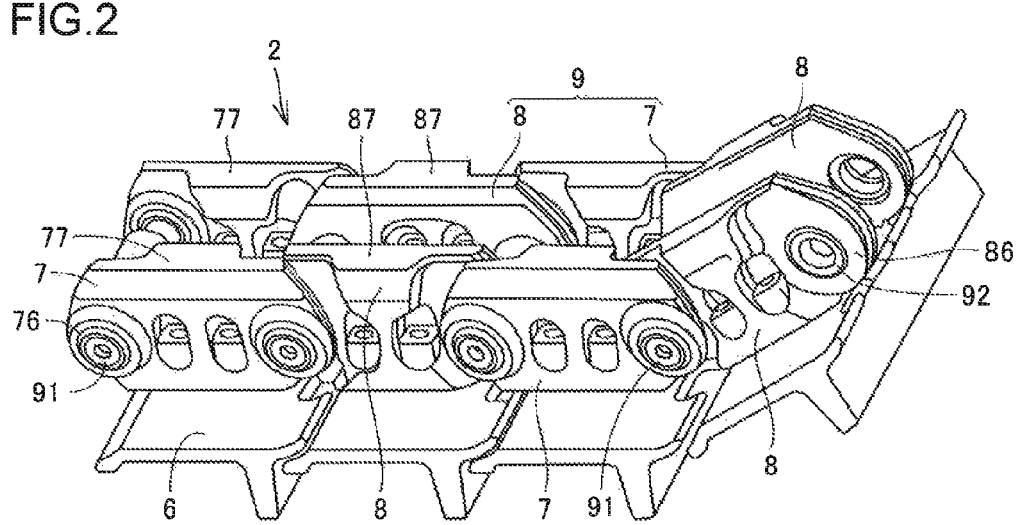
FIG. 2 is a schematic perspective view showing a part of the structure of a track.

The track 2 includes a plurality of track links 9, which are connected endlessly, and track shoes 6, which are connected to the corresponding track links 9. The track links 9 include outer links 7 and inner links 8. The outer links 7 and the inner links 8 are connected alternately. Referring to FIG. 2, each track shoe 6 is fixed to track shoe securing surfaces of a pair of outer links 7 or a pair of inner links 8. This forms two rows of links each made up of the alternately arranged outer links 7 and inner links 8.

Referring to FIG. 1, the idler tumbler 4, the plurality of (here, seven) track rollers 10, and the plurality of (here, two) carrier rollers 11 are attached to the track frame 3 in such a manner that they are rotatable about their respective axes. The sprocket wheel 5 is arranged on the side of one end of the track frame 3. A power source such as an engine is connected to the sprocket wheel 5, and the sprocket wheel 5, being driven by the power source, rotates about its axis. On an outer peripheral surface of the sprocket wheel 5, a plurality of sprocket teeth 51 are arranged, which are projections protruding radially outward. Each sprocket tooth 51 is engaged with the track 2, causing the rotation of the sprocket wheel 5 to be transmitted to the track 2. As a result, the track 2 rotates in a circumferential direction, being driven by the rotation of the sprocket wheel 5.

The idler tumbler 4 is attached to the other end (opposite to the side where the sprocket wheel 5 is arranged) of the track frame 3. The track rollers 10 and the carrier rollers 11 are attached to the track frame 3 in the region sandwiched between the sprocket wheel 5 and the idler tumbler 4, on the ground contact side and on the side opposite to the ground contact side, respectively. The idler tumbler 4, the track rollers 10, and the carrier rollers 11 have their outer peripheral surfaces coming into contact with the inner peripheral surface of the track 2. As a result, the track 2, driven by the rotation of the sprocket wheel 5, rotates in the circumferential direction while being guided by the idler tumbler 4, the sprocket wheel 5, the track rollers 10, and the carrier rollers 11.

Figure 3:
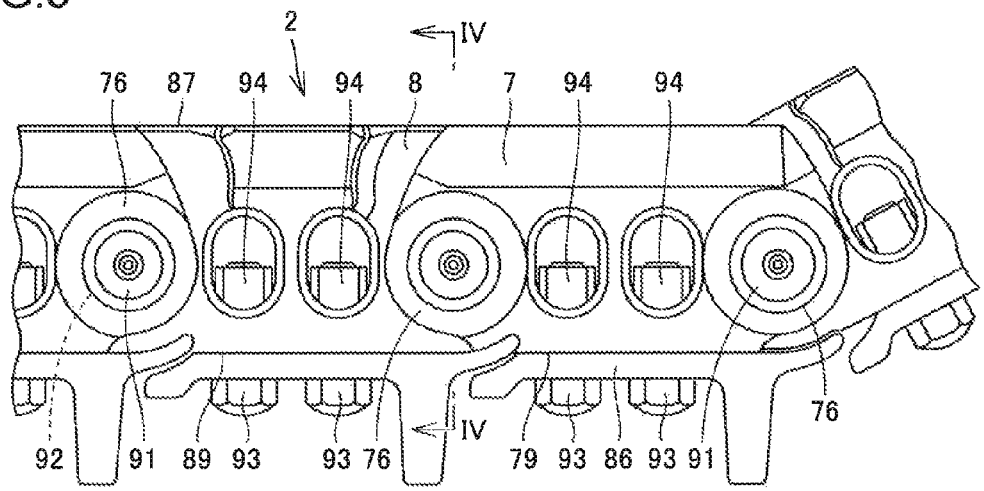
FIG. 3 is a schematic plan view showing a part of the structure of the track.

The structure of the track 2 will now be described in detail. Referring to FIGS. 2 and 3, each track shoe 6 is fastened and secured to the outer links 7 or the inner links 8 by bolts 93 and nuts 94. An outer link 7 and an inner link 8 adjacent to each other are arranged such that they partially overlap each other as seen from the direction perpendicular to the rotational plane of the track 2 (as seen in the viewpoint of FIG. 3), and they are connected using a connecting pin 91 and a bushing 92.

Figure 4:
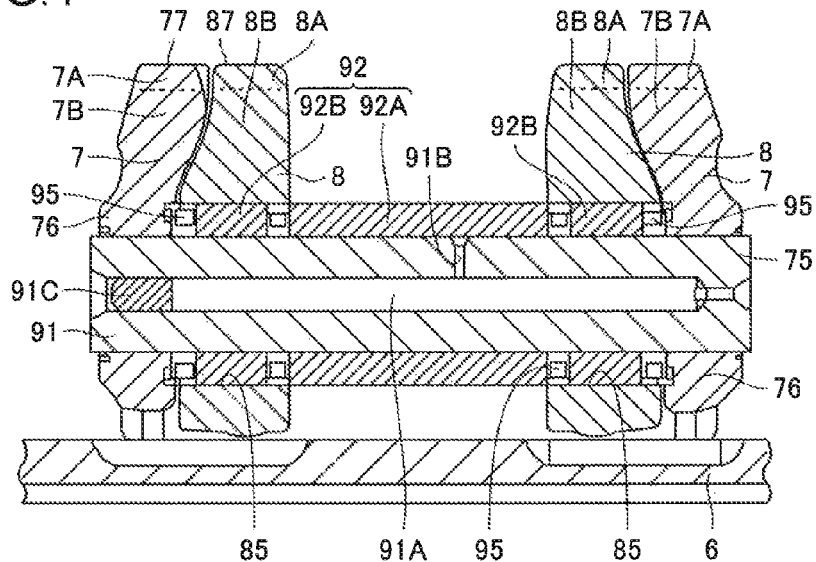
FIG. 4 is a schematic cross-sectional view taken along the line IV-IV in FIG. 3.

More specifically, referring to FIGS. 2 to 4, each inner link 8 has two bushing holes 85 formed to penetrate in the direction perpendicular to the rotational plane of the track 2. Of these two bushing holes 85, one bushing hole 85 is formed at one end in the longitudinal direction of the inner link 8, and the other bushing hole 85 is formed at the other end thereof. Further, the inner link 8 has a rail surface 87 formed on its side opposite to the side on which the track shoe 6 is attached. Each outer link 7 has two connecting pin holes 75 formed to penetrate in the direction perpendicular to the rotational plane of the track 2. Of these two connecting pin holes 75, one connecting pin hole 75 is formed at one end in the longitudinal direction of the outer link 7, and the other connecting pin hole 75 is formed at the other end thereof. Further, the outer link 7 has a rail surface 77 formed on its side opposite to the side on which the track shoe 6 is attached.

A pair of outer links 7 to which a track shoe 6 is secured are arranged in such a manner that their two connecting pin holes 75 are aligned respectively as seen from the direction perpendicular to the rotational plane of the track 2. Similarly, a pair of inner links 8 to which a track shoe 6 is secured are arranged in such a manner that their two bushing holes 85 are aligned respectively as seen from the direction perpendicular to the rotational plane of the track 2. Further, the outer links 7 and the inner links 8 adjacent to each other are arranged in such a manner that the connecting pin holes 75 and the bushing holes 85 are aligned as seen from the direction perpendicular to the rotational plane of the track 2. Then, referring to FIG. 4, a connecting pin 91 is disposed in such a way as to penetrate through the connecting pin hole 75 of the outer link 7 belonging to one row, the bushing hole 85 of the inner link 8 belonging to the one row, the bushing hole 85 of the inner link 8 belonging to the other row, and the connecting pin hole 75 of the outer link 7 belonging to the other row. The connecting pin 91 is press-fitted into the connecting pin holes 75, and its respective ends are caulked at bosses 76 of the corresponding outer links 7 so as to be fixedly secured to the pair of the outer links 7.

Referring to FIG. 4, a bushing 92 includes a pair of fixed bushings 92B and a rotatable bushing 92A arranged between the pair of fixed bushings 92B. The rotatable bushing 92A and the pair of fixed bushings 92B are of hollow cylindrical shape having through holes in the regions including their axes. The rotatable bushing 92A and the pair of fixed bushings 92B are arranged coaxially. A seal ring 95 is arranged between the rotatable bushing 92A and the fixed bushing 92B. The fixed bushing 92B is fixedly secured as it is fitted into the bushing hole 85 of the inner link 8. The connecting pin 91 is disposed to penetrate through the through holes of the rotatable bushing 92A and the pair of fixed bushings 92B. This allows the rotatable bushing 92A to rotate in the circumferential direction relative to the connecting pin 91.

Further, referring to FIG. 4, the connecting pin 91 has a lubricant reservoir 91A, formed to extend in the axial direction in the region including the axis of the pin, for storing a lubricant such as lubricating oil. The connecting pin 91 also has a lubricant passage 91B, formed to extend in the radial direction, for communication between the outer peripheral surface and the lubricant reservoir 91A. The lubricant reservoir 91A has an opening on one end face of the connecting pin 91, and a plug 91C is fitted into the opening. The lubricant such as lubricating oil is supplied from the opening of the lubricant reservoir 91A into the lubricant reservoir 91A and, with the plug 91C fitted into the opening, stored in the lubricant reservoir 91A. The lubricant inside the lubricant reservoir 91A is supplied via the lubricant passage 91B to between the outer peripheral surface of the connecting pin 91 and the inner peripheral surface of the rotatable bushing 92A. This alleviates the friction between the outer peripheral surface of the connecting pin 91 and the inner peripheral surface of the rotatable bushing 92A, and suppresses the abrasion of the outer peripheral surface of the connecting pin 91 and the inner peripheral surface of the rotatable bushing 92A. That is, the track 2 is a rotatable bushing type track belt having the above-described structure including the rotatable bushings 92A.

When the rotation of the sprocket wheel is transmitted to the track in the track travel device, the sprocket teeth are engaged with the bushings attached to the track links. In a track travel device equipped with a conventional track having no rotatable bushings, the engagement of the sprocket teeth with the bushings causes wear of the outer peripheral surfaces of the bushings, which would often determine the life of the track travel device or the parts replacement cycles. In contrast, in the track travel device 1 in the present embodiment equipped with the rotatable bushing type track, the sprocket teeth 51 are engaged with the rotatable bushings 92A which are rotatable with respect to the connecting pins 91. This leads to longer lives of the bushings 92. As a result, the lives of the track links 9 often determine the life of the track travel device 1 or the parts replacement cycles. More specifically, wear of the rail surfaces 77 of the outer links 7 and the rail surfaces 87 of the inner links often determines the life of the track travel device 1 or the parts replacement cycles.

In this regard, the track travel device 1 according to the present embodiment adopts, as the material constituting the outer links 7 and the inner links 8, the steel for a tracked undercarriage component which contains: not less than 0.39% by mass and not more than 0.45% by mass of carbon, not less than 0.2% by mass and not more than 1.0% by mass of silicon, not less than 0.10% by mass and not more than 0.90% by mass of manganese, not less than 0.002% by mass and not more than 0.005% by mass of sulfur, not less than 0.1% by mass and not more than 3.0% by mass of nickel, not less than 0.70% by mass and not more than 1.50% by mass of chromium, and not less than 0.10% by mass and not more than 0.60% by mass of molybdenum, with the balance consisting of iron and unavoidable impurities. In more detail, of the track links 9 made of the above-described steel for a tracked undercarriage component, the regions including the rail surfaces 77 and 87 are partially subjected to quench hardening, to form hardened regions 7A and 8A having a hardness of HRC 57 or more and a reduction of area of 40% or more. Thus, in the regions including the rail surfaces 77 and 87 where wear resistance is required in the track links 9, high wear resistance is achieved and, at the same time, peel resistance is maintained at a high level. As a result, the track links 9 of the present embodiment are excellent in durability. With the track links 9 improved in durability, the track travel device 1 of the present embodiment including the track 2 of the rotatable bushing type is further improved in durability. For unhardened regions 7B and 8B as the base regions other than the hardened regions 7A and 8A of the track links 9, their hardness is preferably controlled to not less than HRC 30 and not more than HRC 45. This can secure high impact resistance of the track links 9 as a whole.

The above-described steel for a tracked undercarriage component constituting the track links 9 may further contain at least one species selected from the group consisting of not less than 0.05% by mass and not more than 0.20% by mass of vanadium, not less than 0.005% by mass and not more than 0.05% by mass of niobium, not less than 0.01% by mass and not more than 0.15% by mass of zirconium, not less than 0.01% by mass and not more than 0.10% by mass of titanium, and not less than 0.1% by mass and not more than 2.0% by mass of cobalt. Addition of such element(s) can readily improve the reduction of area, leading to further improvement in durability of the track links 9.

The above-described steel for a tracked undercarriage component constituting the track links 9 may further contain not less than 0.001% by mass and not more than 0.005% by mass of boron. This can impart sufficient hardenability to the steel, while restricting the content(s) of the element(s) that would decrease the reduction of area. Boron is coupled with nitrogen contained in the steel to form a nitride. Thus, in order to cause the added boron to function effectively, it is desirable that not less than 0.01% by mass and not more than 0.10% by mass of titanium is added together with boron.

Further, in the above-described steel for a tracked undercarriage component constituting the track links 9, the element composition of the steel is preferably controlled such that Ra, as a sum of a half of the carbon content, a quadruple of the sulfur content, and the content of phosphorus as an unavoidable impurity, takes a value of 0.25% by mass or less. This further improves the durability of the track links 9.

Figure 5:
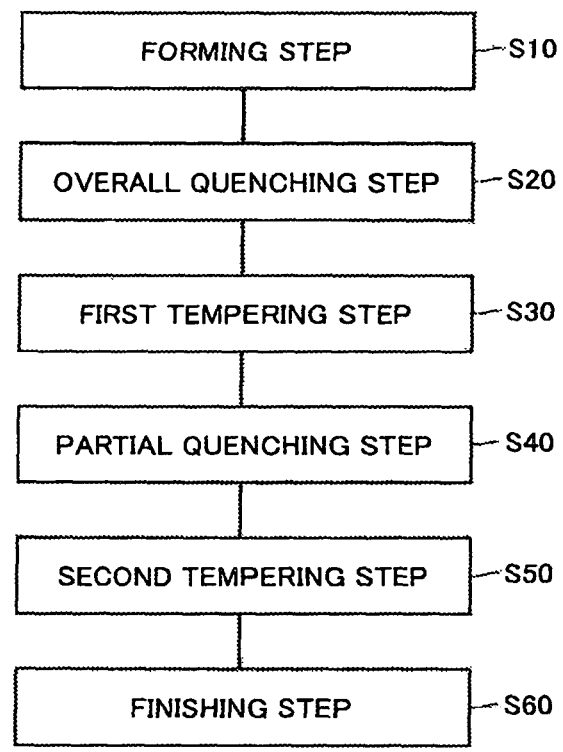
FIG. 5 is a flowchart schematically illustrating the track link producing steps.

An exemplary method for producing a track link 9 will now be described with reference to FIG. 5. In the method for producing the track link 9 in the present embodiment, a forming step (S10) is carried out first. In this step (S10), a steel material having the above-described element composition is prepared and subjected to hot forging, hot trimming, deburring, and other processing, so that it is formed into a desired shape of a track link 9.

Next, an overall quenching step (S20) is carried out. In this step (S20), the entire body formed in the above step (S10) is heated to a temperature equal to or higher than the $A_1$ transformation point of the steel constituting the formed body, and then cooled to a temperature of the $M_s$ point or lower for quenching. The formed body may be heated in an atmospheric furnace, for example.

Next, a first tempering step (S30) is carried out. In this step (S30), the entire body that was quenched in the above step (S20) is heated to a temperature lower than the $A_1$ transformation point of the steel constituting the formed body and then cooled for tempering. More specifically, the formed body is heated to a temperature of not lower than 500° C. and not higher than 650° C. in a furnace, for example, and retained for a period of not shorter than 30 minutes and not longer than 300 minutes, and then cooled. In this manner, the entirety of the formed body is controlled to a hardness of not less than HRC 30 and not more than HRC 45, for example. This renders the formed body as a whole to attain excellent toughness.

Next, following the machining of the rail surface 77, 87 and the track shoe securing surface, a partial quenching step (S40) is carried out. In this step (S40), part of the formed body tempered in the above step (S30), or more specifically, the part (hardened region 7A, 8A) including the region corresponding to the rail surface 77, 87, is heated to a temperature of the $A_1$ transformation point or higher, and then cooled to a temperature of the $M_s$ point or lower, for quenching. This partial quenching may be performed by induction hardening, for example.

Next, a second tempering step (S50) is carried out. In this step (S50), the formed body partially quenched in the above step (S40) is heated to a temperature which is lower than the $A_1$ transformation point of the steel constituting the formed body and which is lower than the heating temperature in the above step (S30) and then cooled for tempering. More specifically, the formed body is heated to a temperature of not lower than 100° C. and not higher than 300° C. in a furnace, for example, and retained for a period of not shorter than one minute and not longer than 300 minutes, and then cooled. Through this step, the region quenched in the above step (S40), i.e. the hardened region 7A, 8A including the region corresponding to the rail surface 77, 87, is controlled to a hardness of not less than HRC 57 and not more than HRC 60. This enables the hardened region 7A, 8A to have the hardness of HRC 57 or more and the reduction of area of 40% or more.

Next, a finishing step (S60) is carried out if necessary. In this step (S60), finishing processing necessary for the formed body that has undergone the heat treatment in the above steps (S20) to (S50) is carried out. The track link 9 according to the present embodiment can be produced by the above-described process.

As explained above, when a steel material made of the steel for a tracked undercarriage component having the above-described element composition is formed into a body and the heat treatment in the above steps (S20) to (S50) is performed thereon, then the hardness of HRC 57 or more and the reduction of area of 40% or more can be achieved in the region (hardened region 7A, 8A) including the rail surface 77, 87, and the wear resistance and peel resistance in that region can be improved. On the other hand, the region (unhardened region 7B, 8B) that was not quenched in the above step (S40) maintains the state achieved by tempering in the above step (S30). Therefore, the unhardened region 7B, 8B is excellent in toughness. As such, according to the production process described above, the track link 9 excellent in durability can be produced.

While the steel for a tracked undercarriage component of the present invention was applied to the track links in the above embodiment, the use of the steel for a tracked undercarriage component of the present invention is not limited thereto. The steel for a tracked undercarriage component of the present invention is suitable as a material constituting the tracked undercarriage components, such as bushings, track rollers, and sprocket teeth, for which high wear resistance and high peel resistance are both required.

EXAMPLES

Example 1

An experiment was conducted to investigate the way of improving wear resistance of a tracked undercarriage component while maintaining peel resistance at a high level. The procedure of the experiment was as follows.

First, steel materials having the element compositions shown in Table 1 below were prepared. In Table 1, the materials A to F and O to Q are steels for a tracked undercarriage component of the present invention (Examples), and the materials G to N are steels falling outside the scope of the present invention (Comparative Examples).

TABLE 1

| Materials | C | Si | Mn | P | S | Ni | Cr | Mo | V | Nb | Ti | Zr | Al | B | Co | Fe | Note |
|---|---|---|---|---|---|---|---|---|---|---|---|---|---|---|---|---|---|
| A | 0.43 | 0.71 | 0.40 | 0.011 | 0.005 | 1.61 | 1.00 | 0.51 | — | 0.022 | 0.020 | — | 0.024 | 0.0022 | — | Bal. | Examples |
| B | 0.41 | 0.25 | 0.78 | 0.011 | 0.003 | 1.29 | 0.80 | 0.17 | — | — | — | — | 0.030 | — | — | Bal. | |
| C | 0.39 | 0.21 | 0.74 | 0.016 | 0.005 | 1.36 | 0.70 | 0.17 | — | — | — | — | 0.030 | — | — | Bal. | |
| D | 0.42 | 0.25 | 0.81 | 0.016 | 0.003 | 1.29 | 0.80 | 0.20 | — | — | — | — | 0.025 | — | — | Bal. | |
| E | 0.43 | 0.24 | 0.39 | 0.017 | 0.002 | 1.29 | 1.01 | 0.40 | — | 0.033 | 0.031 | — | 0.032 | 0.0031 | — | Bal. | |
| F | 0.45 | 0.25 | 0.77 | 0.012 | 0.004 | 1.30 | 0.81 | 0.18 | — | — | — | — | 0.026 | — | — | Bal. | |
| G | 0.43 | 0.69 | 0.39 | 0.009 | 0.008 | 1.60 | 1.00 | 0.50 | — | 0.030 | 0.032 | — | 0.026 | 0.0024 | 1.0 | Bal. | Comparative |

TABLE 1-continued

| Materials | C | Si | Mn | P | S | Ni | Cr | Mo | V | Nb | Ti | Zr | Al | B | Co | Fe | Note |
|---|---|---|---|---|---|---|---|---|---|---|---|---|---|---|---|---|---|
| H | 0.43 | 0.71 | 0.37 | 0.009 | 0.007 | 1.58 | 1.00 | 0.50 | — | 0.028 | 0.034 | — | 0.021 | 0.0027 | 2.0 | Bal. | Examples |
| I | 0.41 | 0.24 | 0.39 | 0.009 | 0.008 | 0.04 | 0.99 | 0.50 | — | 0.026 | 0.030 | — | 0.024 | 0.0024 | — | Bal. | |
| J | 0.41 | 0.25 | 0.39 | 0.009 | 0.008 | 1.60 | 0.99 | 0.68 | — | 0.032 | 0.030 | — | 0.025 | 0.0022 | — | Bal. | |
| K | 0.41 | 0.26 | 0.40 | 0.010 | 0.008 | 2.59 | 1.00 | 0.51 | — | 0.024 | 0.030 | — | 0.029 | 0.0017 | — | Bal. | |
| L | 0.47 | 0.25 | 0.40 | 0.010 | 0.008 | 1.59 | 0.98 | 0.68 | — | 0.022 | 0.020 | — | 0.026 | 0.0021 | — | Bal. | |
| M | 0.44 | 0.27 | 0.83 | 0.011 | 0.008 | 2.62 | 0.81 | 0.22 | — | 0.014 | 0.026 | — | 0.027 | 0.0028 | — | Bal. | |
| N | 0.43 | 0.27 | 0.41 | 0.011 | 0.007 | 2.61 | 0.99 | 0.51 | — | 0.031 | 0.026 | — | 0.023 | 0.0027 | — | Bal. | |
| O | 0.43 | 0.43 | 0.76 | 0.012 | 0.004 | 0.16 | 0.81 | 0.40 | 0.09 | — | 0.033 | — | 0.029 | 0.0022 | — | Bal. | Examples |
| P | 0.43 | 0.25 | 0.41 | 0.013 | 0.003 | 1.31 | 1.00 | 0.45 | — | — | 0.021 | 0.03 | 0.026 | 0.0025 | — | Bal. | |
| Q | 0.43 | 0.23 | 0.40 | 0.015 | 0.005 | 1.29 | 1.01 | 0.50 | — | 0.031 | 0.032 | — | 0.027 | 0.0028 | 1.0 | Bal. | |

The material I, as a conventional steel for a tracked undercarriage component, was used to examine a material characteristic to be used as an index of peeling resistance. Specifically, tensile test specimens and Charpy impact test specimens varying in hardness were prepared by subjecting the pieces to induction hardening under the same conditions and then controlling the tempering temperature, and tests were conducted using the test specimens. For the tensile test specimen and Charpy impact test specimen, JIS Z 2201 (Japanese Industrial Standards) 14A test specimen (diameter ϕ 6 mm) and JIS Z 2202 (2-mm U notch) test specimen were adopted, respectively. The relationship between the hardness and the impact value, the relationship between the hardness and the elongation, and the relationship between the hardness and the reduction of area, obtained by the tests, were studied.

Figure 6:
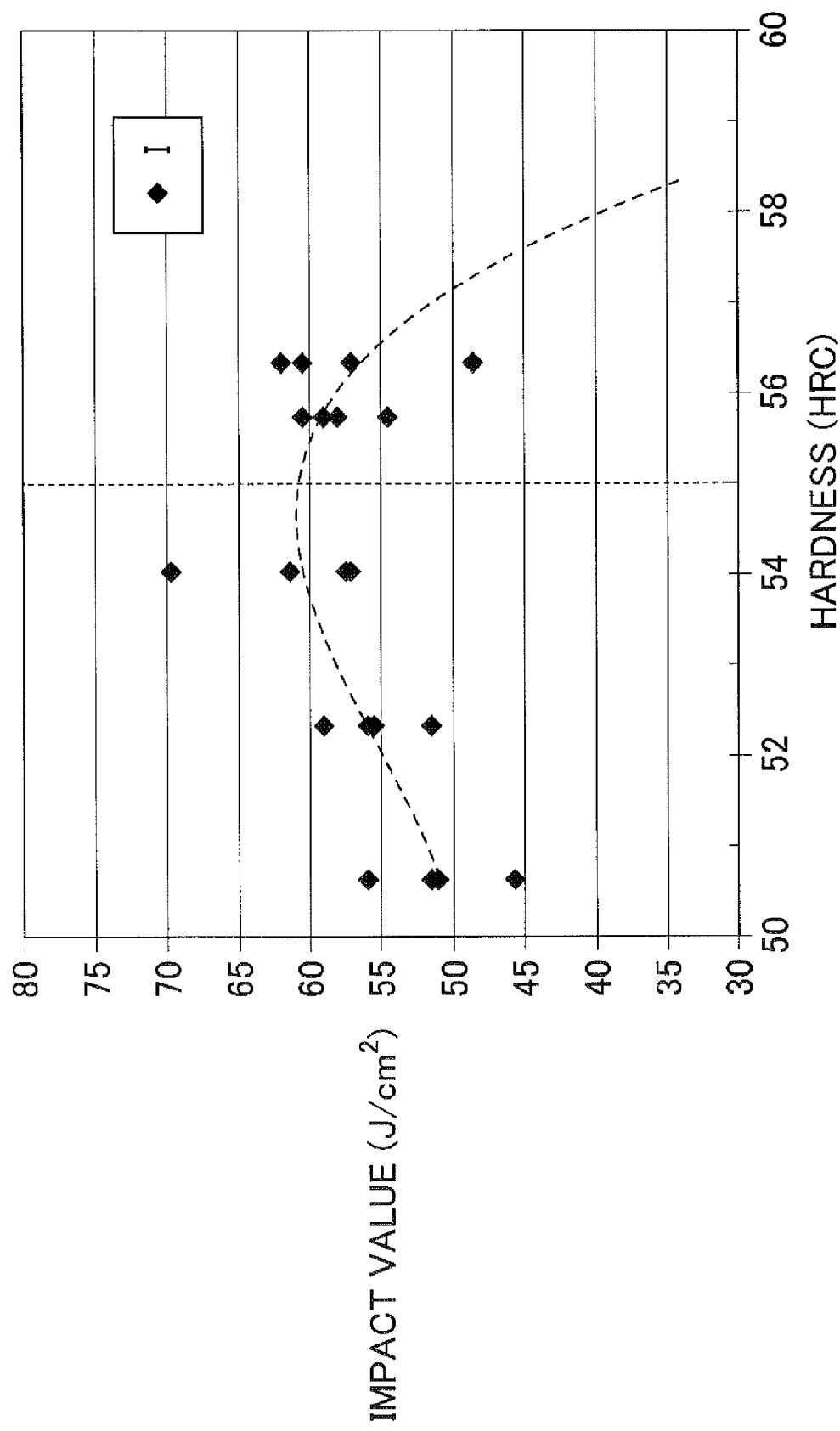
FIG. 6 shows a relationship between the hardness and the impact value.

Referring to FIG. 6, the impact value is maximal around the hardness of HRC 54. The impact value is higher with the hardness of HRC 56 than with the hardness of HRC 51, for example. In the case where a track link is used in practice, with the track link made of the material I, it is often the case that the rail surface peels off when the hardness of the rail surface becomes HRC 55 or more. This means that the increased Charpy impact value does not directly lead to improved peel resistance. Therefore, it can be said that the Charpy impact value is inappropriate as an index of peel resistance.

Figure 7:
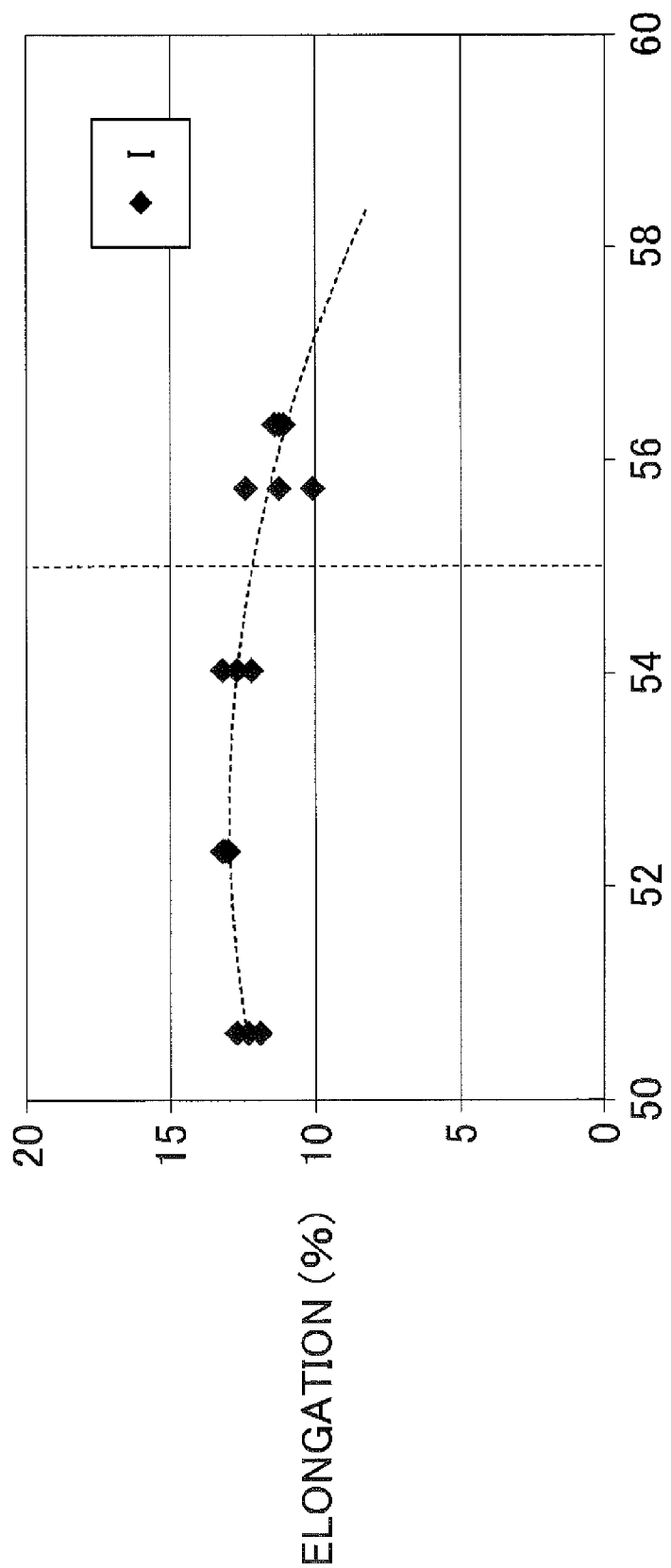
FIG. 7 shows a relationship between the hardness and the elongation.

Referring to FIG. 7, the elongation in the tensile test does not vary considerably in the hardness range of HRC 50 or more. Around the hardness of HRC 55 as well, which is a threshold value above which the occurrence of peeling of the rail surface of the track link becomes conspicuous, the variation in elongation is not large. Thus, it can be said that the elongation in the tensile test is also inappropriate as an index of peel resistance.

Figure 8:
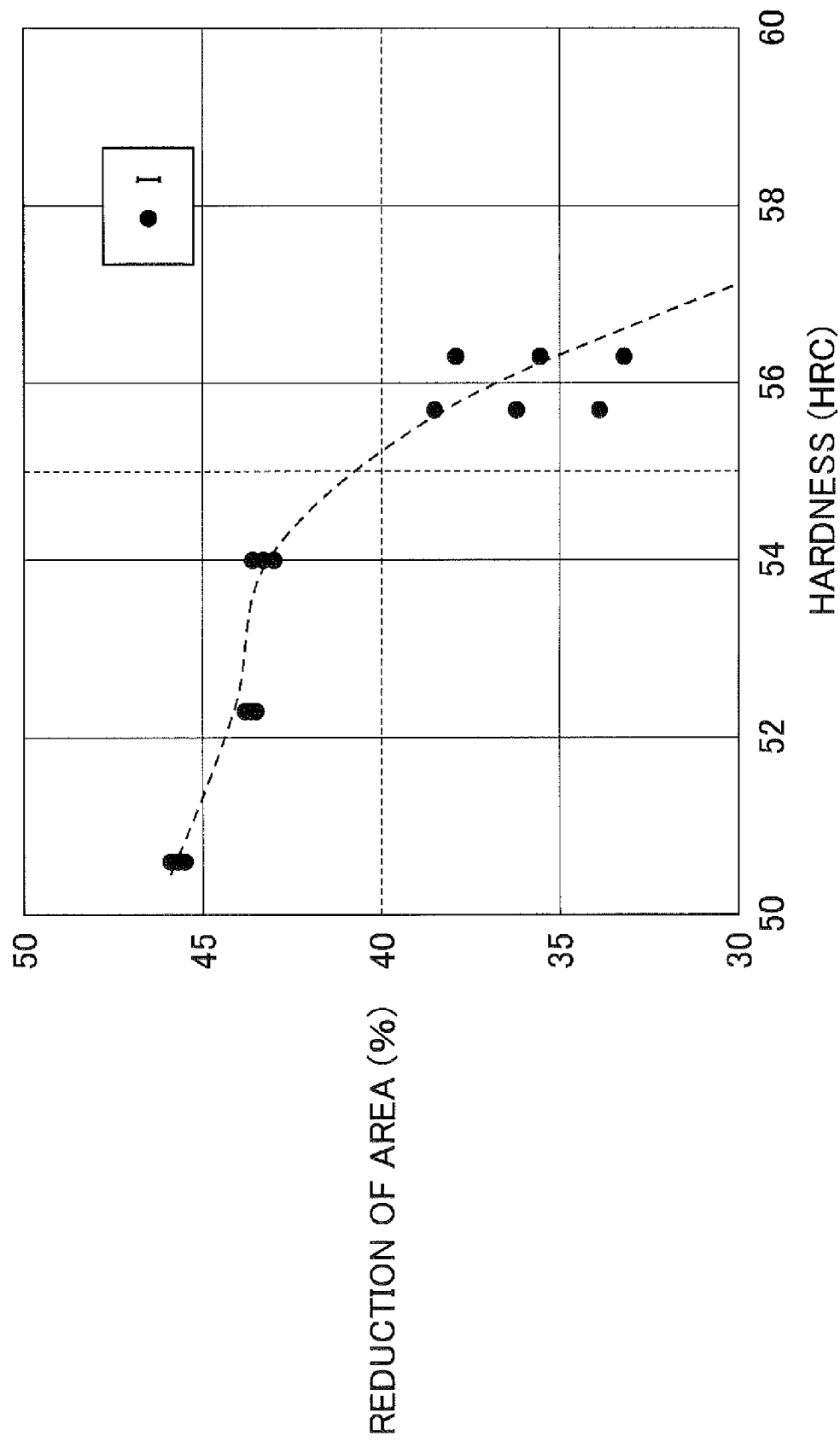
FIG. 8 shows a relationship between the hardness and the reduction of area.

On the other hand, referring to FIG. 8, the reduction of area in the tensile test decreases steeply as the hardness exceeds HRC 55. From this, it can be said that the reduction of area in the tensile test is appropriate as an index of peel resistance. Taking into consideration that the peeling is suppressed with the hardness less than HRC 55 in the track link made of the material I as the conventional steel for a tracked undercarriage component, the reduction of area of 40% or more can be set as the index for securing the peel resistance. On the basis of the results of studies as described above, the present inventors have set the hardness of HRC 57 or more and the reduction of area of 40% or more as target values, from the standpoints of improving wear resistance while maintaining good peel resistance. Considering the variations of the production process conditions and the like, it is desirable to secure the hardness of HRC 58 or more.

Next, the materials J to N, which were obtained by adding Ni (nickel), having the effect of improving toughness, to the above-described material I, increasing the amount of C (carbon), having the effect of increasing the hardness, therein, and changing the contents of Mo (molybdenum) and Nb (niobium) therein, were subjected to induction hardening and then the tempering temperature was controlled to prepare tensile test specimens varying in hardness, and the tensile test was conducted. The test specimens were formed into the same shape as described above. The relationship between the hardness and the reduction of area was studied. The test results are shown in FIG. 9.

Figure 9:
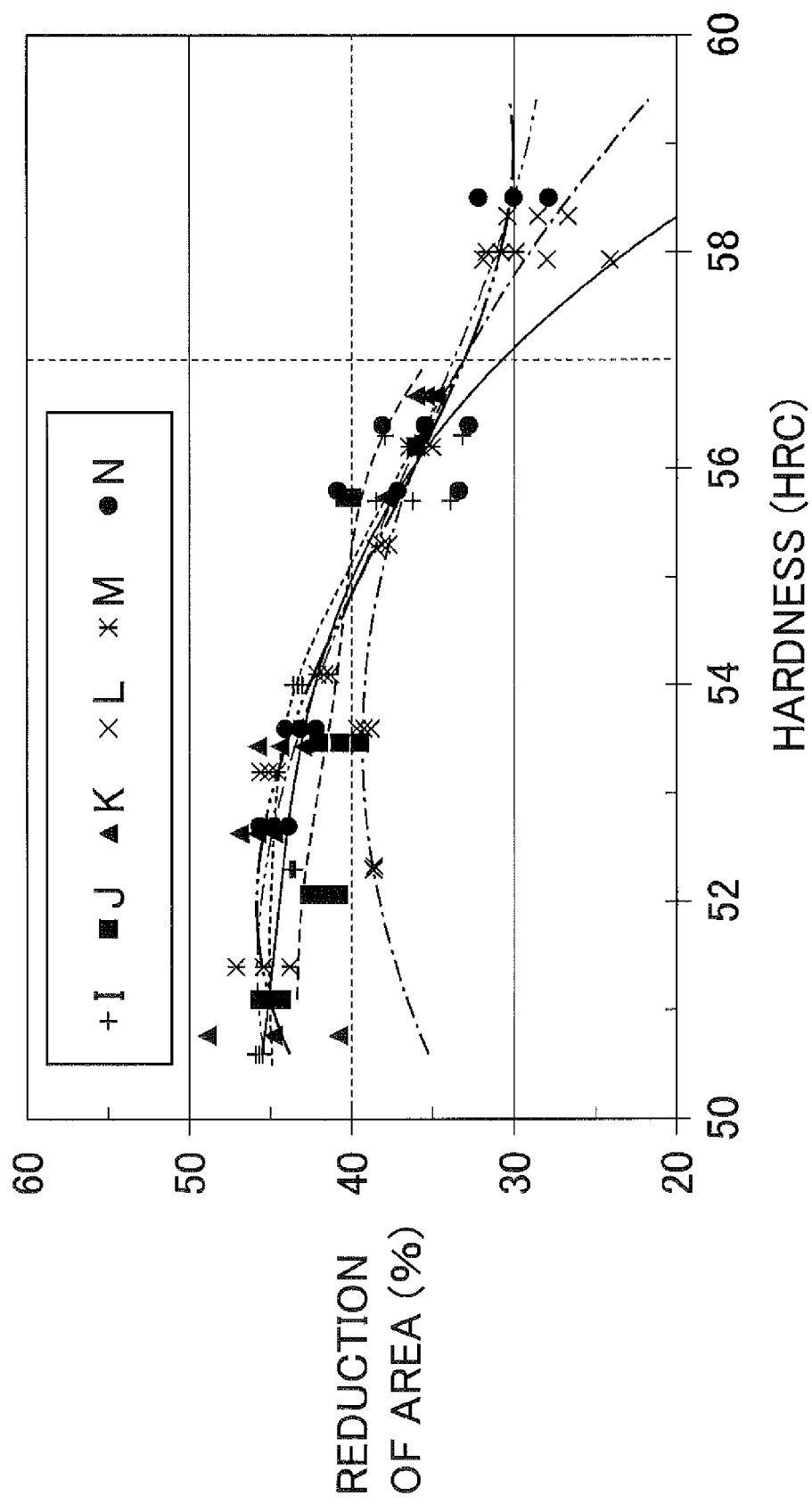
FIG. 9 shows how the contents of nickel and carbon affect the relationship between the hardness and the reduction of area.

Referring to FIG. 9, it was confirmed that, with the above-described control of the elements performed on the material I, it would be difficult to achieve the target values of the hardness of HRC 57 or more and the reduction of area of 40% or more, even if the tempering temperature was controlled to change the hardness.

Next, similar investigations were conducted on the materials G and H, which were obtained by adding Ni to the above-described material I, increasing the amount of C (carbon) therein, and also adding Co (cobalt) thereto. The test results are shown in FIG. 10.

Figure 10:
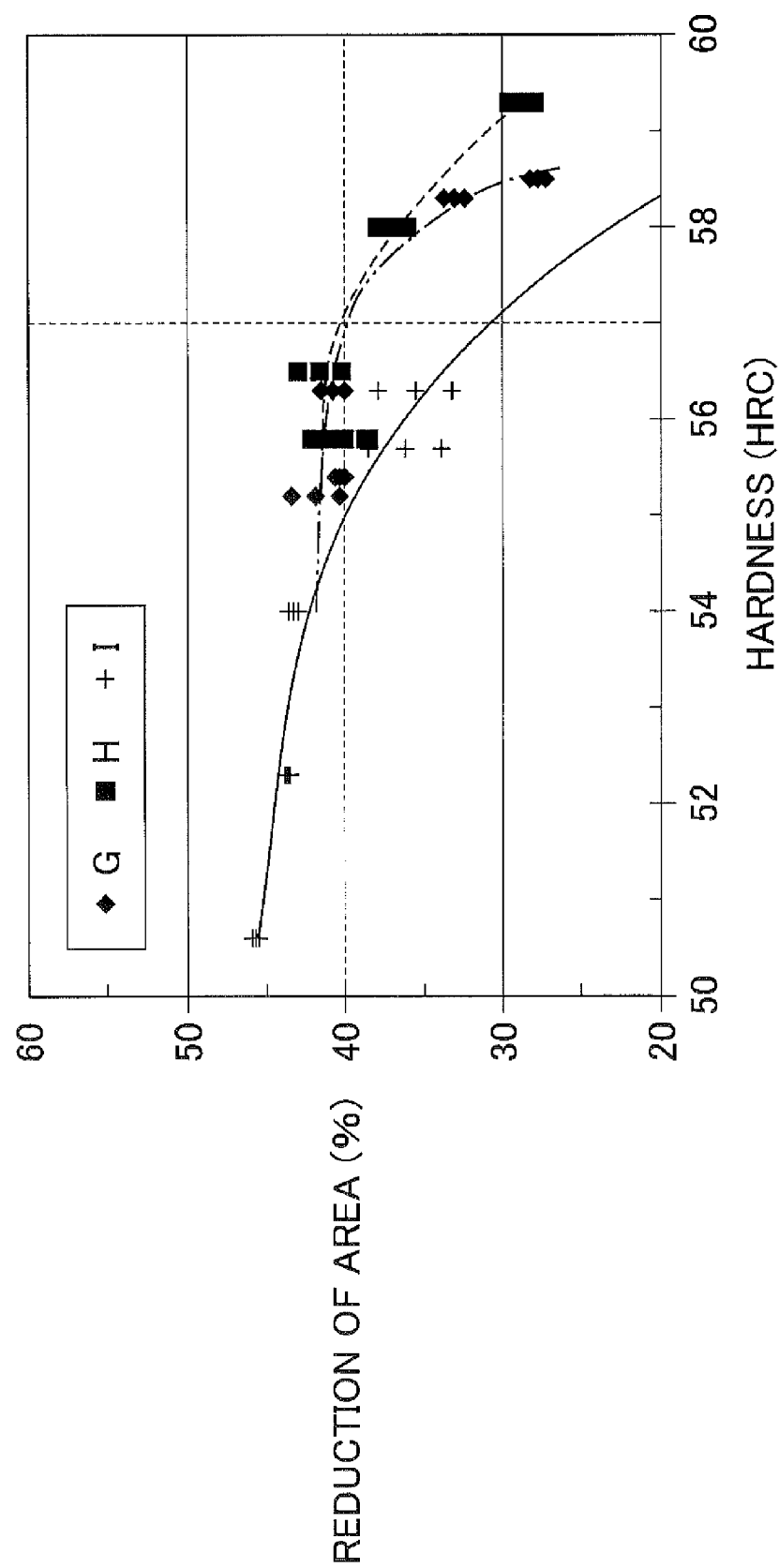
FIG. 10 shows how the contents of nickel, carbon, and cobalt affect the relationship between the hardness and the reduction of area.

Referring to FIG. 10, with the above-described control of the elements performed on the material I, the above-described target values have been achieved only in a very narrow range. Considering the variations of the elements of the steel and the variations of the thermal treatment conditions and the like in the actual production process of the tracked undercarriage components, however, it will not be easy to surely impart desired properties to the tracked undercarriage components only with the above-described control of the elements.

Next, similar investigations were conducted on the materials A to F and O to Q, which were obtained by adding Ni to the above-described material I, reducing the amount of S (sulfur) therein, and controlling the contents of C, B (boron), V (vanadium), Zr (zirconium), Nb, etc. therein. The test results are shown in FIG. 11.

Figure 11:
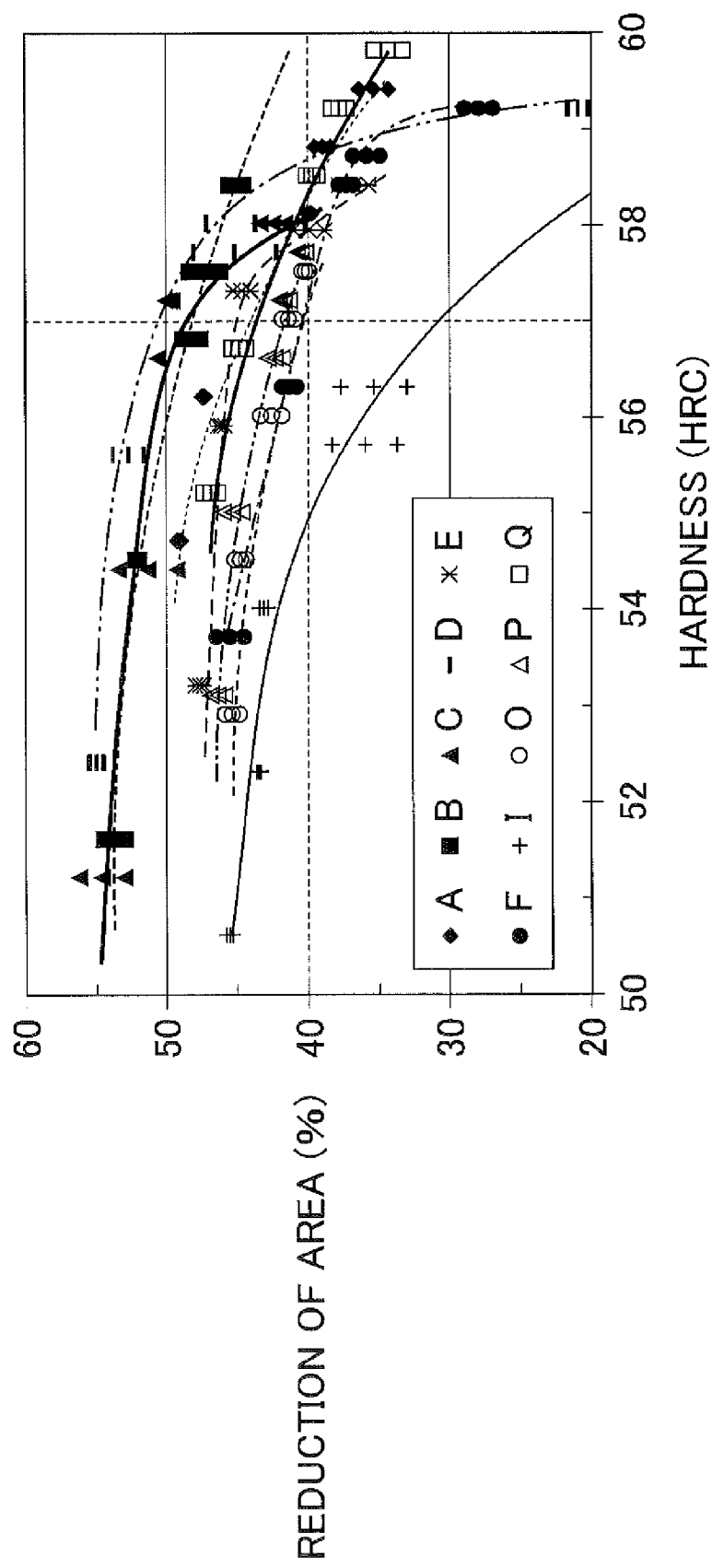
FIG. 11 shows how the contents of nickel, carbon, sulfur, etc. affect the relationship between the hardness and the reduction of area.

Referring to FIG. 11, it has been found that it is very effective to reduce the amount of S for decreasing the reduction of area. It has also been found that the above-described target values can be achieved using the materials A to F and O to Q, which are the inventive examples. Further, it has been found from FIG. 11 that the addition of B, Nb, Ti, V, Zr, or Co is effective for achieving the above-described target values. Thus, according to the steel for a tracked undercarriage component of the present invention, it is possible to increase the hardness as compared to the conventional material I, while maintaining the reduction of area in the tensile test at a high level. As a result, it is possible to improve the wear resistance of the tracked undercarriage component, while maintaining the peel resistance at a high level.

Further, an element composition for achieving the reduction of area of 40% or more while securing a more preferable hardness of HRC 58 or more was investigated. Specifically, for each of the materials A to Q in Table 1, except for those that could not achieve the hardness of HRC 58 or more even by controlling the tempering temperature, Ra was calculated as a sum of a half of the carbon content, a quadruple of the sulfur content, and the content of phosphorus as an unavoidable impurity. That is, Ra is defined by the following expression (1).

$$Ra = (1/2)C + 4S + P \quad (1)$$

The relationship between the Ra value and the reduction of area when the hardness was controlled to HRC 58 by tempering was studied. The relationship between the Ra value and the reduction of area at that time is shown in FIG. 12.

Figure 12:
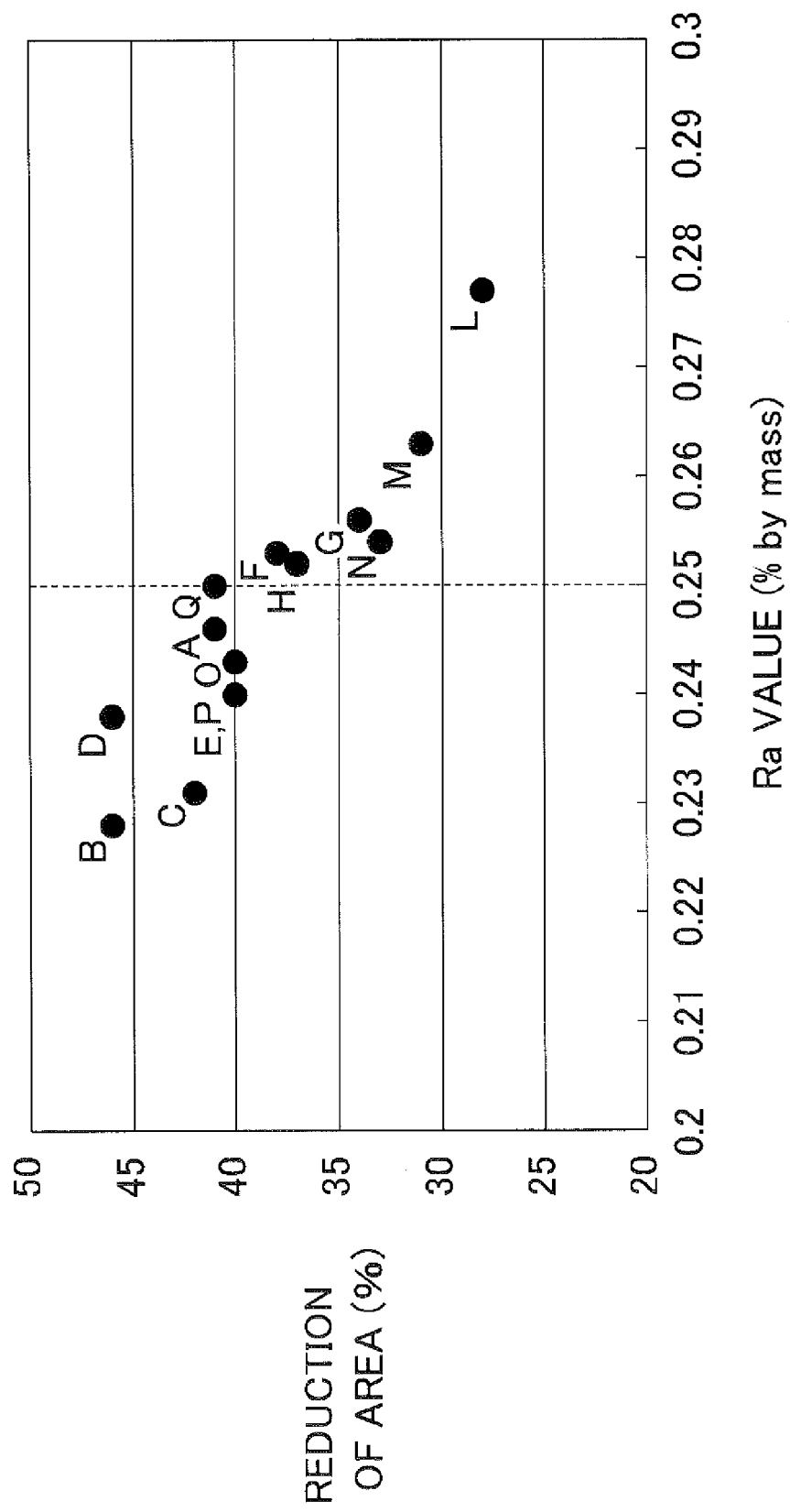
FIG. 12 shows a relationship between the Ra value and the reduction of area.

Referring to FIG. 12, there is a clear correlation between the Ra value and the reduction of area. When the Ra value is set to 0.25% by mass or less, the reduction of area with the hardness controlled to HRC 58 can be made to be 40% or more. From this, it is confirmed that the element composition of the steel is preferably controlled such that the Ra value becomes 0.25% by mass or less. It should be noted that the Ra value of less than 0.22% by mass can be achieved by reducing the amount of C (carbon), for example. If the amount of C is reduced to less than 0.39% by mass, for example, it will be difficult to obtain sufficient hardness. On the other hand, in the case where the amount of C is maintained at a level for securing sufficient hardness, in order to achieve the Ra value of less than 0.22% by mass, the amount of S (sulfur) and the amount of P (phosphorus) as an unavoidable impurity will have to be reduced to very low levels. This leads to an increased production cost of the steel. Thus, from the standpoints of securing sufficient hardness and reducing the production cost, the Ra value is preferably 0.22% by mass or more.

Example 2

An experiment for checking the wear resistance was conducted on the steels for a tracked undercarriage component of the present invention. The procedure of the experiment was as follows.

First, the steel materials of the above materials A and B, as the inventive steels for a tracked undercarriage component, and the steel material of the above material I, as the conventional steel for a tracked undercarriage component, were prepared and subjected to induction hardening and tempering to obtain test specimens. Each test specimen was in the form of disk with a diameter of 60 mm and a height of 7 mm. The test specimen was brought into contact with an outer peripheral surface of a disk-shaped counterpart (hardness: HRC 52) under a surface pressure of 65 kg/mm$^2$, and rotated in a circumferential direction with a relative slip of 1.04 and a rotational speed of 320 rpm. At this time, No. 6 silica sand was introduced at a ratio of 45 g/min to supply the sand (silica sand) between the test specimen and the counterpart. The test specimen was taken out after a lapse of a prescribed time, and the weight reduced due to abrasion (abrasion weight loss) was measured. The test results are shown in FIG. 13.

Figure 13:
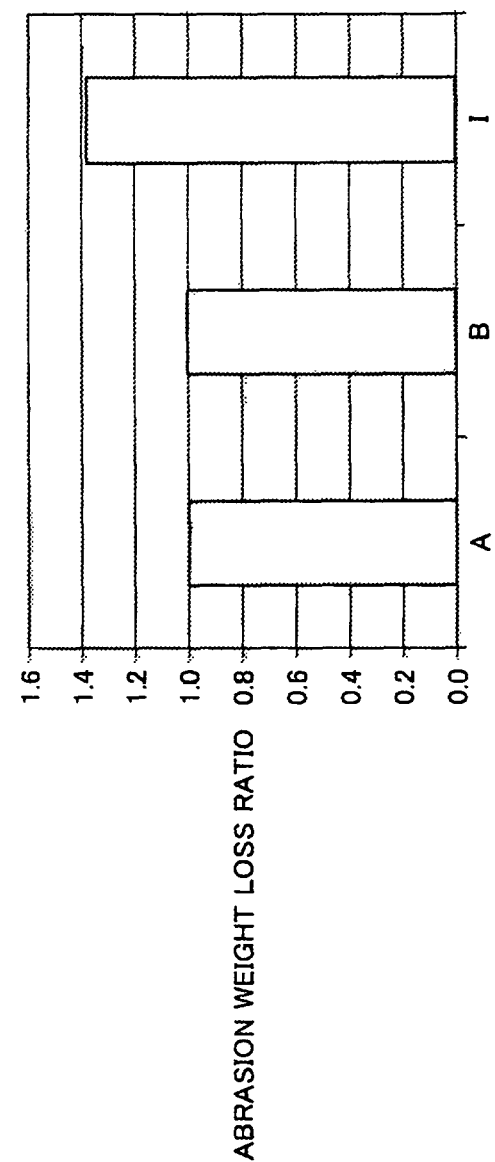
FIG. 13 shows test results of a sand abrasion test.

In FIG. 13, the vertical axis represents abrasion weight loss ratio, with the abrasion weight loss of the material A being set to 1. As shown in FIG. 13, the abrasion weight losses of the materials A and B, as the inventive steels for a tracked undercarriage component, differ by about 38% from the abrasion weight loss of the material I, as the conventional material. From this, it is confirmed that the inventive steels for a tracked undercarriage component are excellent in wear resistance (sand abrasion resistance) as compared to the conventional steel for a tracked undercarriage component.

Example 3

An experiment for checking the impact characteristic was conducted on the steel for a tracked undercarriage component of the present invention. First, steel materials of the above material E, as the inventive steel for a tracked undercarriage component, and the material I, as the conventional steel for a tracked undercarriage component, were prepared and subjected to induction hardening and tempering to obtain test specimens. At this time, for each steel material, test specimens varying in hardness were produced by controlling the tempering temperature. For the test specimen, JIS Z 2202 (2-mm U notch) impact test specimen was adopted. The Charpy impact test was carried out using the produced test specimens, and the relationship between the hardness and the impact value was studied. The test results are shown in FIG. 14.

Figure 14:
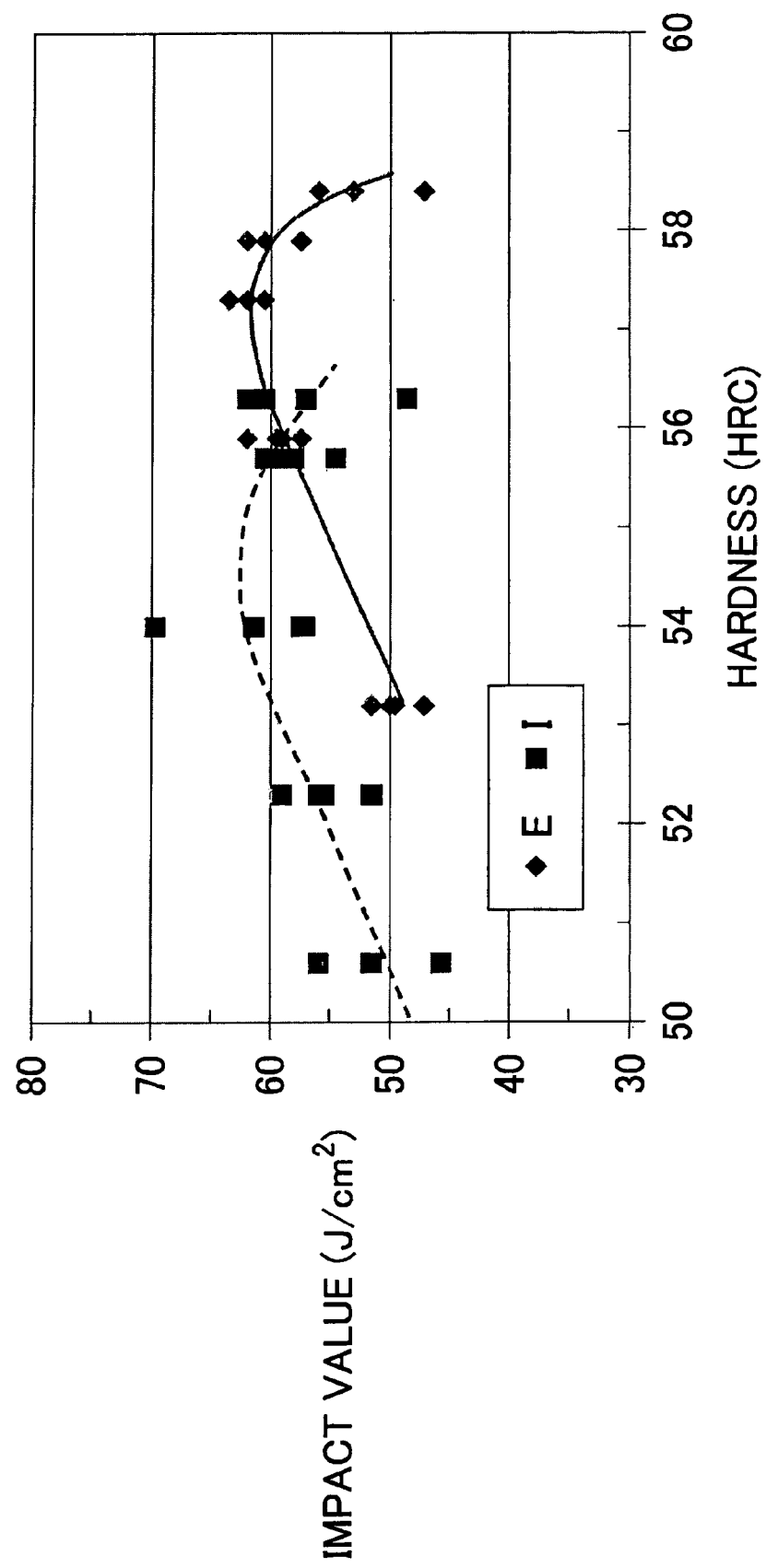
FIG. 14 shows test results of an impact test.

Referring to FIG. 14, the material E as the inventive steel for a tracked undercarriage component has the impact value equivalent to that of the material I as the conventional steel for a tracked undercarriage component, despite the fact that the hardness is increased by about HRC 3. From this, it is confirmed that the inventive steel for a tracked undercarriage component can obtain the impact characteristic superior to that of the conventional steel for a tracked undercarriage component.

It should be understood that the embodiments and examples disclosed herein are illustrative and non-restrictive in every respect. The scope of the present invention is defined by the terms of the claims, rather than the description above, and is intended to include any modifications within the scope and meaning equivalent to the terms of the claims.

INDUSTRIAL APPLICABILITY

The steel for a tracked undercarriage component of the present invention is applicable particularly advantageously as a material constituting the tracked undercarriage component for which high wear resistance and high peel resistance are both required. The track link of the present invention is applicable particularly advantageously to the track link for which improved durability is required.

DESCRIPTION OF REFERENCE NUMERALS

1: track travel device; 2: track; 3: track frame; 4: idler tumbler; 5: sprocket wheel; 6: track shoe; 7: outer link; 7A: hardened region; 7B: unhardened region; 8: inner link; 8A: hardened region; 8B: unhardened region; 9: track link; 10: track roller; 11: carrier roller; 51: sprocket tooth; 75: connecting pin hole; 76: boss; 77: rail surface; 85: bushing hole; 87: rail surface; 91: connecting pin; 91A: lubricant reservoir; 91B: lubricant passage; 91C: plug; 92: bushing; 92A: rotatable bushing; 92B: fixed bushing; 93: bolt; 94: nut; and 95: seal ring.

The invention claimed is:

1. A steel for a tracked undercarriage component used adapted for use as a material constituting a tracked undercarriage component, the steel containing:
not less than 0.39% by mass and not more than 0.45% by mass of carbon, not less than 0.2% by mass and not more than 1.0% by mass of silicon, not less than 0.10% by mass and not more than 0.90% by mass of manganese, not less than 0.002% by mass and not more than 0.005% by mass of sulfur, not less than 0.1% by mass and not more than 3.0% by mass of nickel, not less than 0.70% by mass and not more than 1.50% by mass of chromium, and not less than 0.10% by mass and not more than 0.60% by mass of molybdenum, with the balance consisting of iron and unavoidable impurities.

2. The steel for a tracked undercarriage component according to claim 1, further containing at least one species selected from the group consisting of not less than 0.05% by mass and not more than 0.20% by mass of vanadium, not less than 0.005% by mass and not more than 0.05% by mass of niobium, not less than 0.01% by mass and not more than 0.15% by mass of zirconium, not less than 0.01% by mass and not more than 0.10% by mass of titanium, and not less than 0.1% by mass and not more than 2.0% by mass of cobalt.

3. The steel for a tracked undercarriage component according to claim 1, further containing not less than 0.001% by mass and not more than 0.005% by mass of boron.

4. The steel for a tracked undercarriage component according to claim 1, wherein a value of Ra as a sum of a half of the carbon content, a quadruple of the sulfur content, and the content of phosphorus as an unavoidable impurity is 0.25% by mass or less.

5. The steel for a tracked undercarriage component according to claim 4, wherein the value of said Ra is 0.22% by mass or more.

6. The steel for a tracked undercarriage component according to claim 1, adapted for use as a material constituting a track link.

7. A track link made of a steel containing not less than 0.39% by mass and not more than 0.45% by mass of carbon, not less than 0.2% by mass and not more than 1.0% by mass of silicon, not less than 0.10% by mass and not more than 0.90% by mass of manganese, not less than 0.002% by mass and not more than 0.005% by mass of sulfur, not less than 0.1% by mass and not more than 3.0% by mass of nickel, not less than 0.70% by mass and not more than 1.50% by mass of chromium, and not less than 0.10% by mass and not more than 0.60% by mass of molybdenum, with the balance consisting of iron and unavoidable impurities, the track link comprising:
a base region; and
a hardened region formed to include a rail surface and having a higher hardness as compared to said base region,
said hardened region having a hardness of HRC 57 or more and a reduction of area of 40% or more.

8. The track link according to claim 7, wherein said steel further contains at least one species selected from the group consisting of not less than 0.05% by mass and not more than 0.20% by mass of vanadium, not less than 0.005% by mass and not more than 0.05% by mass of niobium, not less than 0.01% by mass and not more than 0.15% by mass of zirconium, not less than 0.01% by mass and not more than 0.10% by mass of titanium, and not less than 0.1% by mass and not more than 2.0% by mass of cobalt.

9. The track link according to claim 7, wherein said steel further contains not less than 0.001% by mass and not more than 0.005% by mass of boron.

10. The track link according to claim 7, wherein a value of Ra as a sum of a half of the carbon content, a quadruple of the sulfur content, and the content of phosphorus as an unavoidable impurity in said steel is 0.25% by mass or less.

11. The track link according to claim 10, wherein the value of said Ra is 0.22% by mass or more.

12. The track link according to claim 7, wherein said base region has a hardness of not less than HRC 30 and not more than HRC 45.

* * * * *